July 20, 1965  J. D. DIGBY  3,196,100
OXYGEN DETECTING AND MEASURING APPARATUS
Filed Sept. 7, 1961
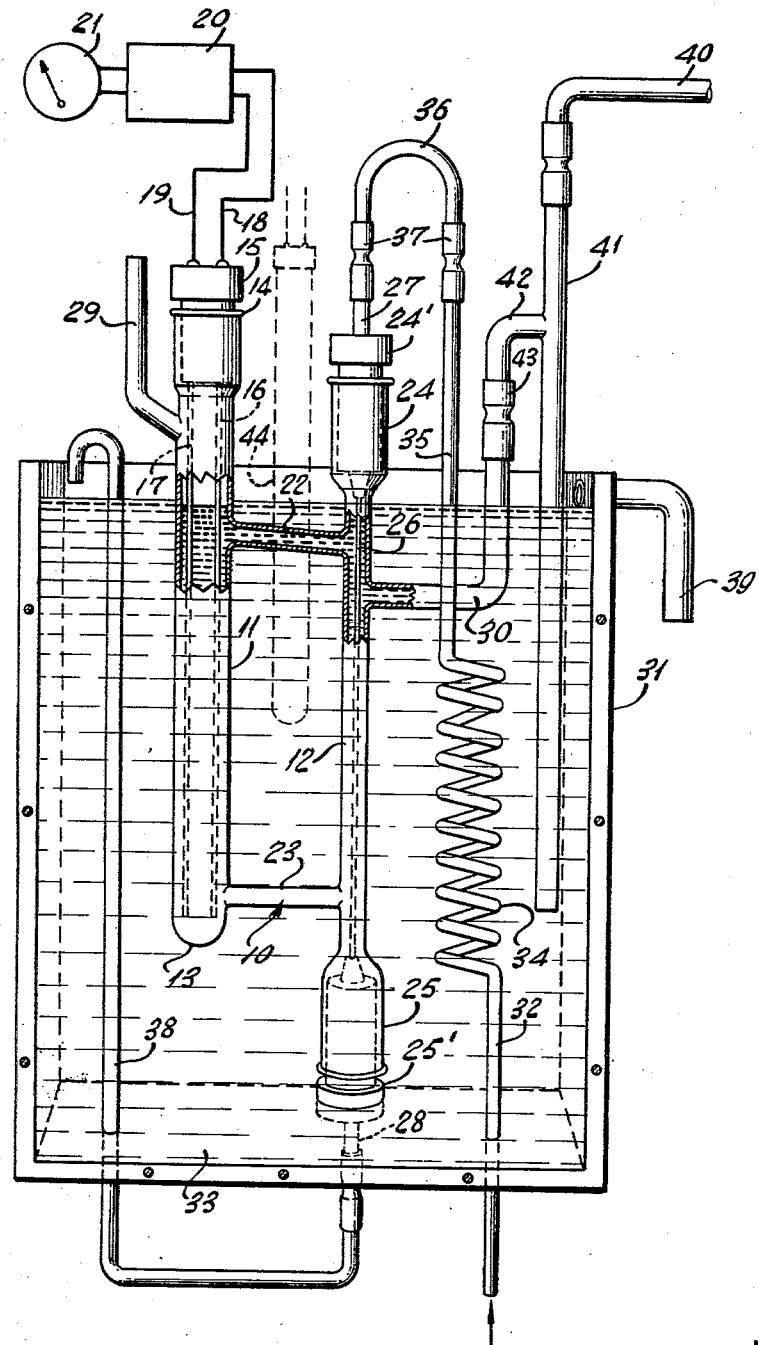
INVENTOR
JAMES D. DIGBY
BY
ATTORNEY

United States Patent Office 3,196,100
Patented July 20, 1965

3,196,100
OXYGEN DETECTING AND MEASURING
APPARATUS
James D. Digby, Croton-on-Hudson, N.Y., assignor to
Cambridge Instrument Company, Inc., New York, N.Y.,
a corporation of New York
Filed Sept. 7, 1961, Ser. No. 136,552
6 Claims. (Cl. 204—195)

This invention relates to the detection and measurement of oxygen and more specifically to a novel and improved method and apparatus for the detection and measurement of oxygen in gas mixtures and dissolved in liquids such as water, blood, blood serum and the like.

This invention affords a novel and improved method and apparatus for the detection and measurement of oxygen whether dissolved in a liquid or mixed with a gas and is characterized by its simplicity, accuracy and dependability. The improved arrangement and coordination of elements in accordance with the invention affords a highly versatile device that may be readily adapted for use in a wide variety of applications.

Another object of the invention resides in the provision of a novel and improved oxygen responsive cell for detecting and measuring oxygen content of liquids and gases.

The above and other objects will become more apparent from the following description and accompanying drawing showing one embodiment of apparatus in accordance with the invention.

The invention, while being readily applicable for measurement of oxygen in both liquids and gases, has been illustrated for use in connection with the measurement of dissolved oxygen in water. It will become apparent, however, that with suitable modifications the detecting and measuring apparatus in accordance with the invention may be utilized for the measurement of dissolved oxygen in a wide variety of liquids, including blood, blood serum and for measurement of the oxygen content of gases.

The measuring cell in accordance with the invention is generally denoted by the numeral 10 and in the instant embodiment of the invention comprises a pair of essentially parallel tubular members 11 and 12. The tubular member 11 has a closed bottom 13 and the upper end 14 is closed by a stopper 15 which carries at least two spaced electrodes 16 and 17. The electrodes extend through the stopper 15 and are electrically connected by leads 18 and 19 to an amplifier 20 having a low impedance conductive input and an indicator 21.

The cylindrical member 12 is in the form of a double, open-ended tube which is connected to the tubular member 11 by upper and lower transverse conduits 22 and 23. The ends of the tube 12 are enlarged as indicated at 24 and 25 and these end portions are closed by stoppers 24' and 25'. Within the tubular member 12 there is an inner tubular member 26 of any desired diameter which extends at least partially through the stoppers 24' and 25', and its ends are coupled to the connecting tubes 27 and 28 extending from the stoppers 24' and 25', respectively. The tube 26 is formed of an oxygen permeable plastic material such as tetrafluorethylene so that, as the liquid under test is passed through the tube 26, dissolved oxygen within the liquid will permeate the tube 26 and be circulated within the cell 10. The cell 10 is filled with any suitable buffer solution of predetermined pH and one solution which is found particularly useful for this purpose is as follows:

50 mls. of 0–2 M boric acid and 0–2 M potassium chloride
21.4 mls. of .2 M caustic potash
Dilute to 200 mls.

The cell 10 is filled with the solution to a point slightly above the transverse conduit 22 so that both tubular members 11 and 12 and transverse members 22 and 23 are completely filled with the solution. The tubular member 11 includes an outlet 29 to permit the discharge of gases from the cell and the tubular member 12 has an inlet tube 30 for the introduction of pure hydrogen into the tube 12 and about the inner tube 26. As the hydrogen gas enters the tubular member 12, it will form bubbles which rise about the tube 26, pass through the tube 22 and into the cell portion 11. In so doing, the liquid within the cell will be caused to circulate through the transverse conduit 22 down through the cell portion 11, through the transverse conduit 23 and upwardly through the cell portion 12 so that the liquid within the cell will be constantly circulated. At the same time, the constant admission of hydrogen into the cell will cause the solution to be maintained at or substantially at saturation and excess hydrogen will leave the cell through the outlet 29.

The electrodes 16 and 17 are formed of conductive materials that are chemically inert in solution and are preferably formed of noble metals. One combination of electrodes that have been found particularly effective involves the use of platinum for one of the electrodes, for instance, electrode 16, and then coating the platinum wire with platinum black. The other electrode 17 may be fabricated of gold, for instance, and it is desirable that the two electrodes be maintained at substantially parallel relationship.

As described above, and in the absence of oxygen, the gold electrode 17 becomes covered by a layer of positively charged hydrogen ions. The platinum electrode 16 is believed to maintain a constant potential which is negative relative to the solution. Since the input impedance of the amplifier 20 is relatively small, the electrode 17 is maintained at substantially the same potential as the electrode 16. However, the layer of hydrogen ions on the gold electrode acts as a barrier to the passage of current and consequently little, if any, current will be indicated by the indicator 21 when the cell is at rest and hydrogen saturated.

In practice, a small current will be experienced which would represent such a minute fraction of the current measured during the operation of the cell that it will introduce little, if any error. Moreover, this current may be balanced out in order to provide a direct reading of oxygen content. It is thought that the current may result from minute traces of impurities in the cell, since a cell of this character is sensitive to salts of certain metals and it is therefore desirable to insure the introduction of pure oxygen into the cell for purposes of measurement and avoid the introduction of contaminants. This of course is attained by this improved structure, since the tube 26 is permeable only to oxygen and thus the contaminating salts cannot enter the cell.

When oxygen is introduced into the cell portion 12 and and is circulated through the cell portion 11, the free oxygen molecules will combine with the hydrogen ions on the surface of the gold electrode to form water and in so doing, an electric charge will be liberated. It is this charge which flows in the external circuit through the amplifier 20 and is recorded by the indicator 21.

In the drawings it will be observed that the cell 10 and associated apparatus is immersed in liquid filled receptacle 31 for the purpose of temperature control. The water to be tested enters the apparatus through a tube 32 extending through the bottom wall 33 of the vessel and passes through a helical heat exchanger 34, thence upwardly through the tube 35 which is connected to the tube 27 by a U-shaped tube member 36 and appropriate couplers 37. The water then flows downwardly through the oxygen pervious tube 26 and is discharged through tubes 28 and 38 into the receptacle 31. An appropriate overflow outlet 39 is provided on the receptacle to maintain uniform water level. With this arrangement the temperature of the water entering the inlet pipe 32 will be adjusted to the temperature of the liquid within the receptacle 31 and the tested water will be discharged into the vessel thus effecting automatic temperature stability. At the same time, the major portion of the cell 10 is also immersed in liquid within the vessel 31 and the cell will therefore be maintained at a temperature corresponding to the liquid. The hydrogen that is fed to the cell in the course of operation is introduced through the tubes 40 and 41, the latter extending vertically into the solution within the receptacle 31. The tube 41 further includes a tube 42 connected to the tube 41 at a point about the level of the liquid within the vessel 31 and this tube is connected by means of a coupler 43 to the cell inlet tube 30. With this arrangement the hydrogen will be delivered to the cell 10 at a relatively constant pressure since an increase in pressure will automatically cause the hydrogen to discharge through the lower end of the tube 41 and into the solution within the vessel 31. By controlling the length of the tube 41 which extends into the liquid in the vessel and by maintaining the hydrogen pressure so that its average is slightly less than that pressure required to cause hydrogen discharge from the tube 41, the pressure can be maintained at a uniform level.

In certain cases it may be desirable to further stabilize the temperature of the liquid within the vessel 31 by the utilization of an immersion heater and thermostat 44 shown in dotted outline.

The current generated by the cell in accordance with the invention is a function of a number of factors including the temperature of the cell, the size of the electrodes utilized within the cell, and of the concentration of a depolarizing substance which in the present instance is oxygen. Inasmuch as the physical characteristics of the cell do not vary and since the temperature can be maintained within reasonably close tolerances, the cell affords an extremely accurate and precise measurement of the quantity of oxygen liberated within the cell. Furthermore, as the cell is sensitive to salts such as those of copper, iron, and lead, as well as other metals, and certain organic compounds, it is important that the electrodes be completely inert in the solution. For this reason noble metals are utilized and the electrodes are formed of different materials in order to effect generation of the desired current within the cell.

From the foregoing description it is evident that the cell 10 which includes the interconnected tubular elements 11 and 12, the oxygen permeable tube 26 and the hydrogen supply 30 may be utilized in other applications. For instance, gases containing uncombined oxygen can be passed through the tube 26 to measure the oxygen content, or liquids such as blood or blood serum may be tested for dissolved oxygen. When measuring the oxygen content of liquids or gases available in very small quantities it may be desirable to utilize a tube 26 in the form of a capillary tube having an exceedingly small passage extending therethrough.

While only one embodiment of the invention has been described, it is obvious that modifications, alterations and changes may be made without departing from the true scope and spirit of the invention as defined by the appended claims.

What is claimed is:
1. Oxygen detecting and measuring apparatus comprising an elongated, vertically disposed vessel having a closed bottom and a pair of vertically spaced openings, a vertically disposed tube adjoining the first said vessel and having vertically spaced openings, conduits joining said upper and lower openings in said vessel and tube, an oxygen selective permeable tube extending through said vertically disposed tube, means closing the ends of said vertically disposed tube about said oxygen permeable tube, an electrolyte filling said vessel and said vertically disposed tube, electrodes extending into said vessel and means on said vertically disposed tube for introducing hydrogen into said electrolyte to maintain it in a hydrogen saturated condition, said hydrogen producing circulation of the electrolyte through said vessel and said vertically disposed tube and causing it to gather oxygen penetrating the permeable tube and distribute it uniformly throughout the electrolyte.

2. Oxygen detecting and measuring apparatus according to claim 1 wherein said electrodes are of different noble metals and said oxygen permeable tube is formed of tetrafluoroethylene.

3. Apparatus for detecting and measuring dissolved oxygen in water comprising a water-filled container having an overflow, an oxygen measuring cell at least partially immersed in the water within said container, said cell having an electrolyte therein and at least two electrodes immersed in said electrolyte, an oxygen selective permeable tube extending through said cell and in contact with the electrolyte, a heat exchanger in said container and having an inlet and outlet, a connection between said outlet and one end of said tube, a conduit connected with the other end of said tube and extending above the level of the water in said container for discharge of water into said container, means for feeding hydrogen into said cell to maintain the electrolyte in a hydrogen saturated condition and means coupled with the inlet of said heat exchanger for feeding water to be measured through said heat exchnager and said tube for discharge into said container, said hydrogen producing circulation of said electrolyte to wash said oxygen permeable tube and distribute the oxygen uniformly through said electrolyte.

4. Apparatus according to claim 3 wherein said cell comprises a pair of vertically disposed tubular elements interconnected by upper and lower conduits and electrodes in one of said elements, and wherein said oxygen selective permeable tube extends through the other of said elements and said hydrogen is introduced into the other of said elements.

5. Apparatus according to claim 4 wherein said electrodes are formed of different noble metals and said container includes water temperature regulating means.

6. Apparatus for detecting and measuring dissolved oxygen in a liquid comprising an elongated, vertically disposed vessel having a pair of vertically spaced openings, an elongated tube adjoining the first said vessel and having its ends connected to said spaced openings, an oxygen selective permeable tube extending through said elongated tube, means for feeding said liquid through said oxygen permeable tube, an electrolyte filling said vessel and said elongated tube, electrodes extending into said vessel and means on said elongated tube for introducing hydrogen into said electrolyte to maintain it in a hydrogen saturated condition and circulate the electrolyte through the vessel and said elongated tube to wash the oxygen permeable tube and distribute the oxygen uniformly through said electrolyte.

References Cited by the Examiner

UNITED STATES PATENTS

| | | | |
|---|---|---|---|
| 998,982 | 7/11 | Pier | 204—129 |
| 2,071,697 | 2/37 | Larrabee | 204—195 |
| 2,370,871 | 3/45 | Marks | 204—195 |
| 2,651,612 | 9/53 | Haller | 204—195 |
| 2,805,191 | 9/57 | Hersch | 204—195 |
| 2,913,386 | 11/59 | Clark | 204—195 |
| 2,927,888 | 3/60 | Beard | 204—1.1 |
| 3,022,241 | 2/62 | Jessop | 204—195 |
| 3,028,317 | 4/62 | Wilson et al. | 204—195 |
| 3,050,371 | 8/62 | Dowson et al. | 204—195 |

WINSTON A. DOUGLAS, *Primary Examiner.*

JOHN R. SPECK, JOHN H. MACK, *Examiners.*